United States Patent Office 3,070,617
Patented Dec. 25, 1962

3,070,617
CYCLIC BISTRIFLUOROPROPYL SILOXANES
George W. Holbrook, Midland, Mich., assignor to Dow Corning Corporation, Midland, Mich., a corporation of Michigan
No Drawing. Filed Sept. 9, 1957, Ser. No. 682,617
3 Claims. (Cl. 260—448.2)

This invention relates to novel cyclic siloxanes which are useful as intermediates in the preparation of copolymers of bistrifluoropropylsiloxane with other siloxanes such as trifluoropropylmethylsiloxane, diphenylsiloxane and the like.

This invention concerns cyclic compounds of the formula $[(CF_3CH_2CH_2)_2SiO]_n$ where $n$ is an integer from 3 to 4 inclusive.

The compositions of this invention may be prepared by the alkaline cracking of the corresponding bistrifluoropropylsiloxane hydrolyzates as hereinafter described. The hydrolyzates are best prepared by hydrolyzing bistrifluoropropyldiethoxysilane which in turn is prepared by reacting trifluoropropylchlorodiethoxy silane with a 1,1,1-trifluoropropylmagnesium halide.

It has been found that the best yields of the bistrifluoropropyldiethoxysilane are obtained when the monotrifluoropropylchlorodiethoxysilane is employed as the intermediate product. In other words, the yield of the bistrifluoropropylsilane is much higher by this procedure than when one reacts a trifluoropropylmagnesium halide with either ethylorthosilicate or with the monotrifluoropropyltriethoxysilane.

The trifluoropropylchlorodiethoxysilane is best prepared by reacting 1,1,1-trifluoropropyltriethoxysilane and 1,1,1-trifluoropropyltrichlorosilane at elevated temperatures, preferably about 130° C., in order to bring about an exchange of the silicon bonded chlorine and alkoxy groups.

The following examples are illustrative of this invention but should not be construed as limiting the scope thereof.

Example 1

194.7 g. of 1,1,1-trifluoro-3-bromopropane was reacted with magnesium in ether solution following conventional techniques. The ether solution of the Grignard reagent was added to 117 g. of 1,1,1-trifluoropropylchlorodiethoxysilane. The precipitated magnesium salts were filtered and the product was fractionated to give a quantitative yield of bistrifluoropropyldiethoxysilane. This material was found to boil at 105° C. at 42 mm. and to have a refractive index at 25° C. of 1.3577 and specific gravity at 27° C. of 1.157.

Example 2

485 g. of bistrifluoropropyldiethoxysilane was added slowly to 360 g. of 5 percent aqueous hydrochloric acid. During the addition the temperature was maintained at 95° C. Ethanol was removed during the reaction. The resulting fluid siloxane was then heated with .5 percent by weight potassium hydroxide at a temperature of 200° to 220° C. The resulting product was a solid material melting at 141.5° to 142° C. which was shown by infrared analysis to be the cyclic compound $$[(CF_3CH_2CH_2)_2SiO]_4$$

Example 3

The solid cyclic tetrasiloxane of Example 2 was mixed with .5 percent by weight KOH and then heated at a temperature of 250° C. under a fractionating column. The cyclic trisiloxane formed was continuously removed from the reflux head. The product was redistilled and found to boil at 155° to 156° C. at 1.6 mm. and to have a melting point of 86.5° to 87° C. Infrared analysis showed this material to be the cyclic compound $[(CF_3CH_2CH_2)SiO]_3$.

That which is claimed is:

1. A cyclic composition of the formula $$[(CF_3CH_2CH_2)_2SiO]_n$$

where $n$ is an integer from 3 to 4 inclusive.

2. A cyclic composition of the formula $$[(CF_3CH_2CH_2)_2SiO]_3$$

3. A cyclic composition of the formula $$[(CF_3CH_2CH_2)_2SiO]_4$$

References Cited in the file of this patent

UNITED STATES PATENTS 2,455,999    Hyde _____ Dec. 14, 1948
2,838,423    Gilkey _____ June 10, 1958

OTHER REFERENCES

Pierce et al.: "Jour. Am. Chem. Soc." vol. 75 (November 1953), pp. 5618–20.

McBee et al.: ibid, vol. 77 (March 1955), pp. 1292–3.

Pierce et al.: "Wright Air Development Center Technical Report 52–191," October 1953, p. 44.

Tarrant: "Wright Air Development Center Technical Report 55–220," August 1955, pp. 12 and 37.

McGregor: "Silicones and Their Uses," McGraw-Hill Book Co. Inc., New York, publisher (1954), pp. 268–72.